(12) United States Patent
Sechrist

(10) Patent No.: US 10,816,889 B1
(45) Date of Patent: Oct. 27, 2020

(54) DYNAMIC AND MULTI-SIDED VIEWING PROJECTION SCREEN ASSEMBLY FOR A GARAGE DOOR AND SYSTEM THEREOF

(71) Applicant: David Timothy Sechrist, San Diego, CA (US)

(72) Inventor: David Timothy Sechrist, San Diego, CA (US)

( * ) Notice: Subject to any disclaimer, the term of this patent is extended or adjusted under 35 U.S.C. 154(b) by 0 days.

(21) Appl. No.: 16/576,658

(22) Filed: Sep. 19, 2019

(51) Int. Cl.
| | |
|---|---|
| G03B 21/58 | (2014.01) |
| E06B 9/68 | (2006.01) |
| E06B 9/62 | (2006.01) |
| G03B 21/14 | (2006.01) |
| G06F 1/16 | (2006.01) |
| G03B 21/56 | (2006.01) |
| G03B 21/60 | (2014.01) |
| H04M 1/02 | (2006.01) |

(52) U.S. Cl.
CPC ............... *G03B 21/58* (2013.01); *E06B 9/62* (2013.01); *E06B 9/68* (2013.01); *G03B 21/145* (2013.01); *G03B 21/56* (2013.01); *G03B 21/60* (2013.01); *G06F 1/1601* (2013.01); *H04M 1/0268* (2013.01)

(58) Field of Classification Search
CPC ........ G03B 21/56; G03B 21/58; G03B 21/60; G06F 1/1601; H04M 1/0268
USPC ......................................................... 359/461
See application file for complete search history.

(56) References Cited

U.S. PATENT DOCUMENTS

| | | | | |
|---|---|---|---|---|
| 1,110,857 A | * | 9/1914 | Applas ..................... | B60J 1/085 |
| | | | | 296/141 |
| 3,128,688 A | * | 4/1964 | Coda ....................... | G03B 15/06 |
| | | | | 396/3 |
| 5,353,152 A | * | 10/1994 | Realmuto ............... | G03B 21/58 |
| | | | | 160/120 |
| 6,111,694 A | * | 8/2000 | Shopp ..................... | G03B 21/58 |
| | | | | 160/23.1 |
| 6,336,616 B1 | * | 1/2002 | Lin ........................ | G03B 21/58 |
| | | | | 248/222.11 |

(Continued)

OTHER PUBLICATIONS

How to Use a Garage Door as a Movie Screen, Ponderosa Garage Doors & Repair, https://ponderosagaragedoors.com/blog/how-to-use-a-garage-door-as-a-movie-screen/, Jun. 15, 2016, 2 pgs (Year: 2016).*

(Continued)

*Primary Examiner* — Clayton E. LaBalle
*Assistant Examiner* — Kevin C Butler

(57) ABSTRACT

The present invention relates to a dynamic and multi-sided viewing projection screen assembly and system thereof. In particular, the dynamic viewing and multi-sided viewing projection screen assembly includes a video projector screen, a bottom-support member, a top-support member coupled to the video projector screen. The bottom-support member is mounted to one or more bottom-mounting brackets applied to a bottom interior portion of the garage door, while the top member is detachably coupled to one or more top-mounting brackets applied to a top interior portion of the garage door, and the dynamic and multi-sided viewing projection screen assembly is configured to have a plurality of viewing modes of operations, including a first viewing mode of operation and a second viewing mode of operation for when the garage door is in a vertical, downward position or when the garage door is in a horizontal, upward position.

38 Claims, 16 Drawing Sheets

(56) References Cited

U.S. PATENT DOCUMENTS

| | | | | |
|---|---|---|---|---|
| 6,424,463 B1* | 7/2002 | Nishitani | | G03B 21/60 359/449 |
| 6,873,461 B1* | 3/2005 | McPherson, Jr. | | E06B 9/50 160/23.1 |
| 7,198,372 B2* | 4/2007 | Aeling | | B44C 3/02 348/744 |
| 7,489,443 B2* | 2/2009 | Congard | | G03B 21/58 359/461 |
| 7,515,338 B2* | 4/2009 | Canon | | E06B 9/80 160/310 |
| 7,777,948 B2* | 8/2010 | Chung | | G03B 21/56 359/450 |
| 8,035,893 B2* | 10/2011 | Creel | | G03B 21/58 359/443 |
| 8,089,567 B2* | 1/2012 | Chung | | H04N 5/74 348/460 |
| 8,151,858 B2* | 4/2012 | Hughes | | E05D 13/1215 160/113 |
| 9,018,868 B2* | 4/2015 | Lucas | | E06B 9/72 160/133 |
| 1,008,094 A1 | 9/2018 | Manieri | | |
| 10,080,948 B2* | 9/2018 | Manieri | | A63B 69/0002 |
| 2003/0214632 A1* | 11/2003 | Ma | | G03B 21/60 353/31 |
| 2005/0236118 A1* | 10/2005 | Haney | | E06B 7/03 160/310 |
| 2005/0270644 A1* | 12/2005 | Devos | | G03B 21/56 359/461 |
| 2007/0217006 A1* | 9/2007 | Ragni | | G03B 21/58 359/461 |
| 2009/0005911 A1* | 1/2009 | Decroix | | G05B 19/0426 700/275 |
| 2009/0268164 A1* | 10/2009 | Bowden | | B60K 35/00 353/13 |
| 2013/0235455 A1* | 9/2013 | Qingjun | | G03B 21/58 359/461 |
| 2014/0133019 A1* | 5/2014 | Mullet | | E06B 9/62 359/461 |
| 2016/0290037 A1* | 10/2016 | Amsellem | | E06B 3/485 |
| 2018/0126245 A1* | 5/2018 | Lennon | | A63B 71/022 |
| 2018/0283097 A1* | 10/2018 | Alirezaei | | E05F 15/686 |

OTHER PUBLICATIONS projection screen hanging rack L-bracket, Yoycart,https://www.yoycart.com/Product/520306470839/ 2009, 2 pgs (Year: 2009).*
https://ponderosagaragedoors.com/blog/how-to-use-a-garage-door-as-a-movie-screen/.
https://www.aysforum.com/forum/110-diy-screen-section/1474338-garage-door-screen.html.
https://www.youtube.com/watch?v=a8c61Vi_3r8.

* cited by examiner

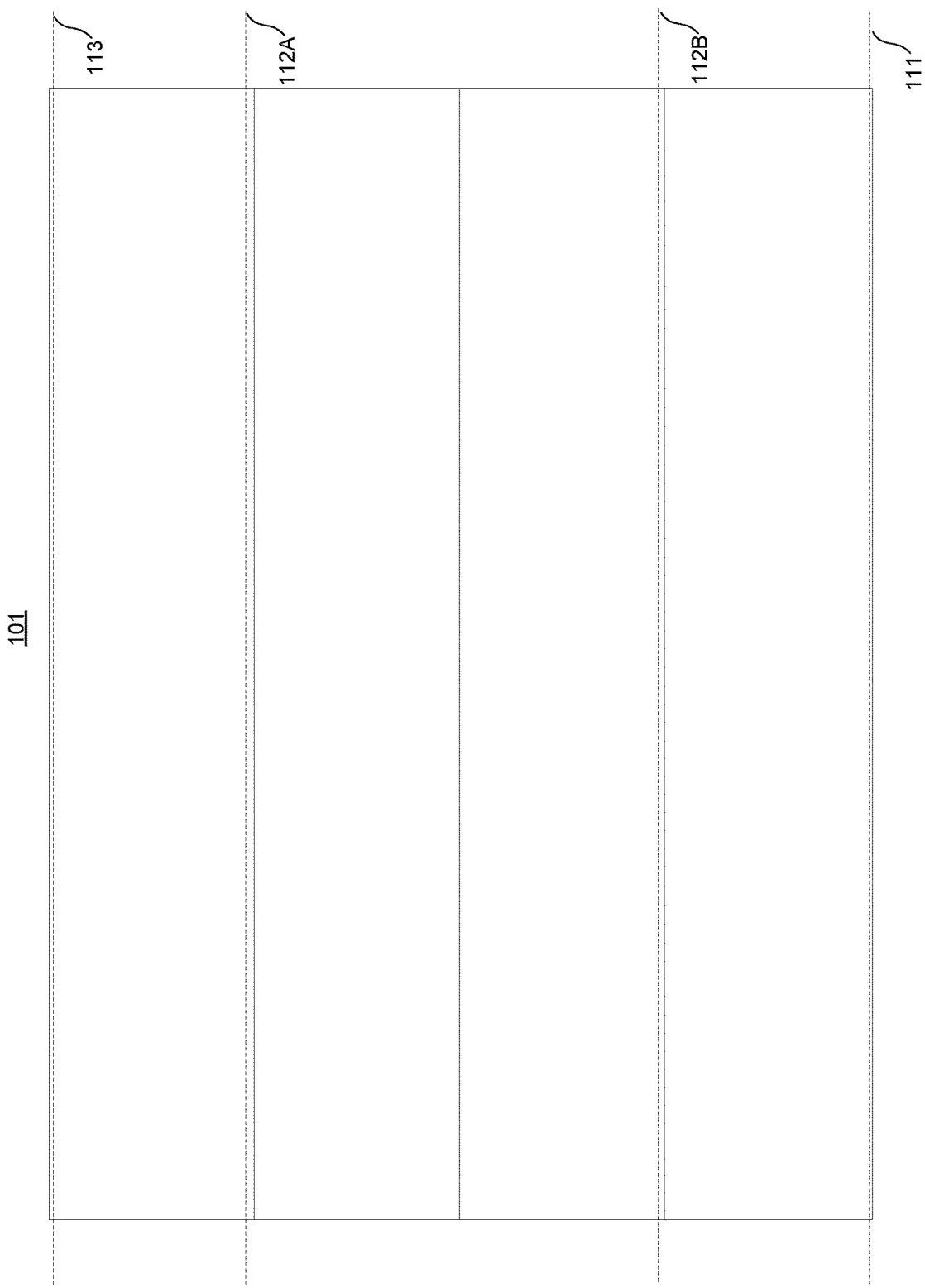

DYNAMIC AND MULTI-SIDED VIEWING PROJECTION SCREEN ASSEMBLY FOR A GARAGE DOOR AND SYSTEM THEREOF

FIELD OF THE INVENTION

The present invention relates to a dynamic and multi-sided viewing projection screen assembly. Particularly, the dynamic viewing and multi-sided viewing projection screen assembly includes a multi-sided viewing projector screen, a top-support bar, and a bottom-support bar and mounting fasteners coupled and fixed to a bottom portion of a garage door, allowing for multiple and dynamic viewing sides for different garage door positioning and settings.

BACKGROUND

Portable projectors include a flat and relatively thin surface onto which a video image may be projected by a video projector. In order to provide for clear higher resolution by new video projectors, screen surfaces have been improved via smooth fabrics, allowing for intense clarity even when images are displayed on a 100" or larger screen.

Just as there are specific kinds of projectors for various features desired, there are also screens including ones for business, home use, as well as a variety of other applications. Additionally, there are both front and rear projection screens available. With rear projection screens, the image is projected onto the back-side of the screen. Both curved portable screens and flat screens are also available. There are clear screens for rear projection, as well as inflatable screens for front projection, and plastic thicker screens for projecting holograms through. There are also spherical internal projection displays that are not dependent on one particular kind of projector, without a pre-manufactured projector attached. There are numerous pros and cons of different projector screens, dependent on the primary purpose of the screen. For example, portable and roll-up type projector screens have the advantage of not taking up permanent space when placed in either a room or outside. Overall, these types of portable screens allow users the ease of set-up and take down.

Some portable screen disadvantages include the potential of the viewing surface not retaining a constant tension or uniformity. Larger outdoor screens are also known to often have folds or creases in the surface of the screen. Other factors encountered outdoors that can cause problems with the actual screen surface are wind, temperature, and humidity. Temperature and humidity changes may also affect large portable screens, even when used indoors. Outdoor screens also could possibly encounter bugs or other objects between the projector and the screen on both front and rear projection screens.

Front-lit projection screens have the advantage of having much less damaging affect upon the eyes, due to the light actually being reflected. The larger the screen is, the greater percentage of your visual field is filled with less overall brightness. Some negatives for front-lit projector screens include: 1) ambient light washing out the reflected light much easier than it does with direct light; 2) the overall noise produced from the projector fan can be distracting; and 3) the light being projected can be easily blocked by anything passing in front of it.

Back-lit projection screens are less likely to be susceptible to the washing out of colors and brightness by ambient light. However, the light is more direct and can be harsher on the eyes over time.

There are many variables for the user to consider, depending on what their viewing purpose is and the level of quality desired. The intensity of light available in projectors is redefining what can be considered as an acceptable viewing surface. It is a fast-changing industry, which may explain why television manufacturers appear to be pushing through major changes so quickly before they may become obsolete.

Though some projector screens are made to be portable, placement of such screens on dynamic and changing surroundings in an indoor or outdoor environment may not be ideal or unsustainable by available projector screens or systems, without compromising image quality or requiring additional setup and work to achieve an ideal image projected onto the screen that allows a viewer or audience to view and enjoy the video, movie, or presentation. Thus, there is a need for a projector screen system supporting dynamic changes in a surrounding area, providing owners of projector screen systems ease, cost, and time-savings of setting up and operating these projector screen systems, without the hassle or hardship of having to readjust or remount the projector screen when the surrounding area changes.

SUMMARY

It is an advantage of the present invention to provide a dynamic and multi-sided viewing projection screen assembly for a garage door. The dynamic and multi-sided viewing projection screen assembly includes a video projector screen having a first end, a second end opposite to the first end, a front-side viewing surface, and a back-side viewing surface opposite to the front-side viewing surface. The front-side viewing surface and the back-side viewing surface are configured to receive and display a projected image or video from a video projector. A bottom-support member is coupled to the first end of the video projector screen. The bottom-support member is also coupled to one or more bottom-fasteners applied to a first interior portion of the garage door. A top-support member is coupled to the second end of the video projector screen, wherein the top-support member is detachably coupled to one or more top-fasteners applied to a second interior portion of the garage door. The dynamic and multi-sided viewing projection screen assembly is configured to have a plurality of viewing modes of operations, including a first viewing mode of operation and a second viewing mode of operation. In the first viewing mode of operation, when the garage door is closed or nearly closed in a vertical, downward position, the top-support member is attached to the one or more top-fasteners at the second end of the video projector screen, exposing the front-side viewing surface. In the second viewing mode of operation, when the garage door is open in a horizontal, upward position, the top-support member is detached from the one or more top-fasteners, allowing the second end of the video projector screen to hang downward exposing the front-side viewing surface and the back-side viewing surface.

It is another advantage of the present invention to provide a dynamic and multi-sided viewing projection screen system for a garage door. The dynamic and multi-sided viewing projection screen system, having a video projector; a video projector screen having a first end, a second end opposite to the first end, a front-side viewing surface, and a back-side viewing surface opposite to the front-side viewing surface. The front-side viewing surface and the back-side viewing surface are configured to receive and display a projected image or video from the video projector at a predetermined fixed focal distance. A bottom-support member is coupled to the first end of the video projector screen. The bottom-support member is coupled to one or more bottom-fasteners applied to a first interior portion of the garage door. A top-support member is coupled to the second end of the video projector screen. The top-support member is detachably coupled to one or more top-fasteners applied to a second interior portion of the garage door. The dynamic and multi-sided viewing projection screen system is configured to have a plurality of viewing modes of operations, including a first viewing mode of operation and a second viewing mode of operation. In the first viewing mode of operation, when the garage door is closed or nearly closed in a vertical, downward position, the top-support member is attached to the one or more top-fasteners at the second end of the video projector screen, exposing the front-side viewing surface. In the second viewing mode of operation, when the garage door is open in a horizontal, upward position, the top-support member is detached from the one or more top-fasteners allowing the second end of the video projector screen to hang downward exposing the front-side viewing surface and the back-side viewing surface.

In another embodiment, the bottom-support member includes a shaft or an automatic roll-up shaft assembly. In yet another embodiment, the top-support member includes a shaft, bar, or rod. In another embodiment, the dynamic and multi-sided viewing projection screen assembly also includes a third viewing mode of operation, wherein a privacy and block-out screen is applied to the back-side viewing surface of the projector screen, and the top-support member is detached from the one or more top-mounting brackets, allowing the second end of the video projector screen to hang downward exposing the front-side viewing surface in the third viewing mode of operation, when the garage door is in a horizontal, upward position. In still yet another embodiment, the bottom-mounting brackets include L-brackets, bolts, pins, threaded screws, plates, metal welding, adhesive joints or a combination thereof.

In one aspect, the top-mounting brackets include C-shaped brackets, j-hooks, clips, clasps, quick release locking mechanisms, pressure release locking mechanisms or a combination thereof. In another aspect, the video projector screen is composed of thin sheets of material, including natural or synthetic fabrics, plastics or other composite flexible materials having a white to light-gray colored surface with a contrast capable of reflecting and/or partially transmitting the projected image or video by the video projector. In yet another aspect, weighted stabilizers are coupled to the top-support member via a detachable hook and a support chain, chord, rope, or cable. In still yet another aspect, the dynamic and multi-sided viewing projection screen assembly is encased in a projector screen case for housing and protecting the projection screen assembly.

These and other objects, features, and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 16 illustrates various mounting locations of the dynamic and multi-sided viewing projection screen assembly on the garage door, according to an embodiment.

In the appended figures, one or more elements may have the same reference numeral in different figures, indicating that it was previously described.

DETAILED DESCRIPTION

The application and context of the present invention described herein will be made in reference to a garage door, generally made for a garage of units such as single family homes, townhomes, condominiums, or businesses. The garage door may include a small or large door that opens either manually or automatically, via an electric motor having a remote control unit (i.e., a garage door opener). Garage doors may be of various sizes and may accommodate one or more automobiles, watercrafts, other types of vehicles or other storable items. Types of garage doors may include a single panel that is made to lift and tilt up and back toward the garage ceiling when opened, while other types of garage doors may include multiple sectional panels coupled to rollers that are made to roll up on guided tracks towards the garage ceiling, or rolled up above the doorway.

Figure 1:
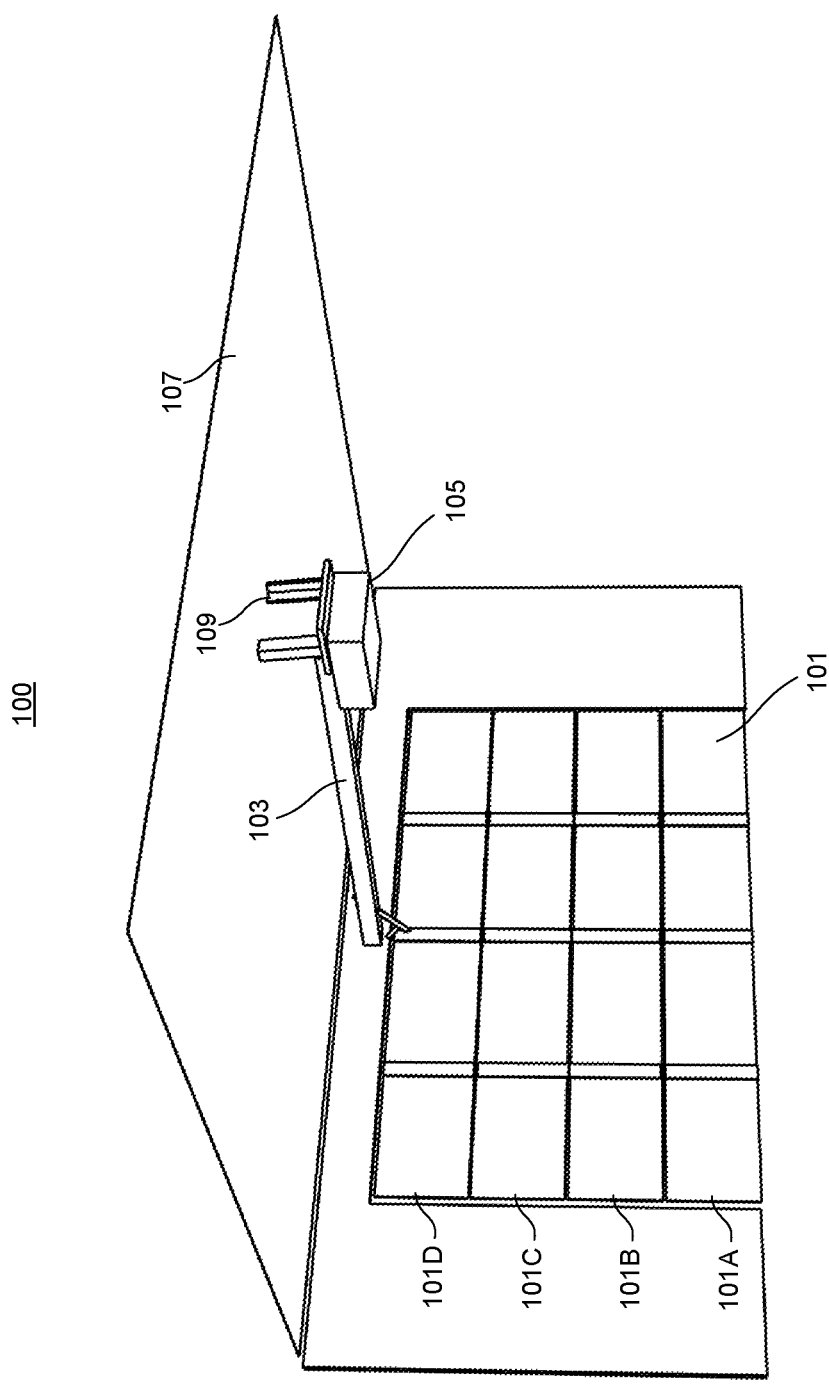
FIG. 1 illustrates an example of a typical automatic garage door system onto which the present invention will be mounted and applied.

FIG. 1 illustrates an example of a typical automatic garage door system 100 onto which the present invention will be mounted and applied. In this example, the automatic garage door system 100 includes a garage door 101, having multiple sectional panels (101A-101D) and, as shown in this example, being in a closed position (or vertical, downward position) preventing vehicles or people entry into the inside of the garage. The automatic garage door system 100 may also include a rail and chain assembly 103 for applying a force to vertically drive the garage door 101 to the open or closed position. A motorized controller 105 (mounted to the ceiling 107 via metal straps or fasteners 109) coupled to the rail and chain assembly 103, which controls the operation of the garage door 101. In addition, the automatic garage door system 100 may include other ancillary parts such as rollers and guided tracks (not shown) for supporting the garage door 101 and keeping the rollers along the tracks. A remote controller (not shown) wirelessly couples to the motorized controller 105 for automatically and remotely opening and closing the garage door 101.

Figure 2:
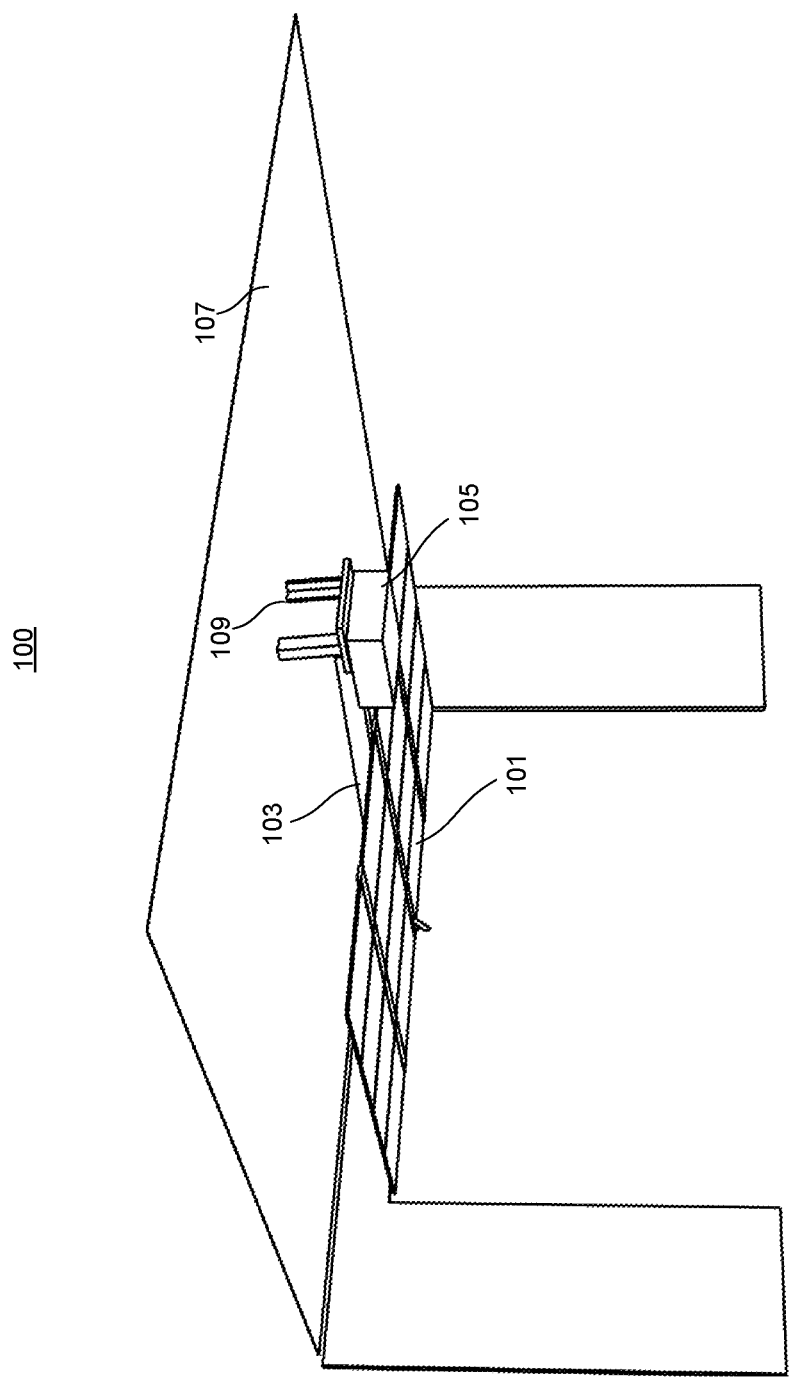
FIG. 2 illustrates an example of the typical automatic garage door system being in an open position (or horizontal, upward position).

FIG. 2 illustrates an example of a typical automatic garage door system 100 being in an open position (or horizontal, upward position). At the open position, the garage door 101 is moved to the fully upward position allowing vehicles or people to access and pass through an opening of the garage.

Figure 3:
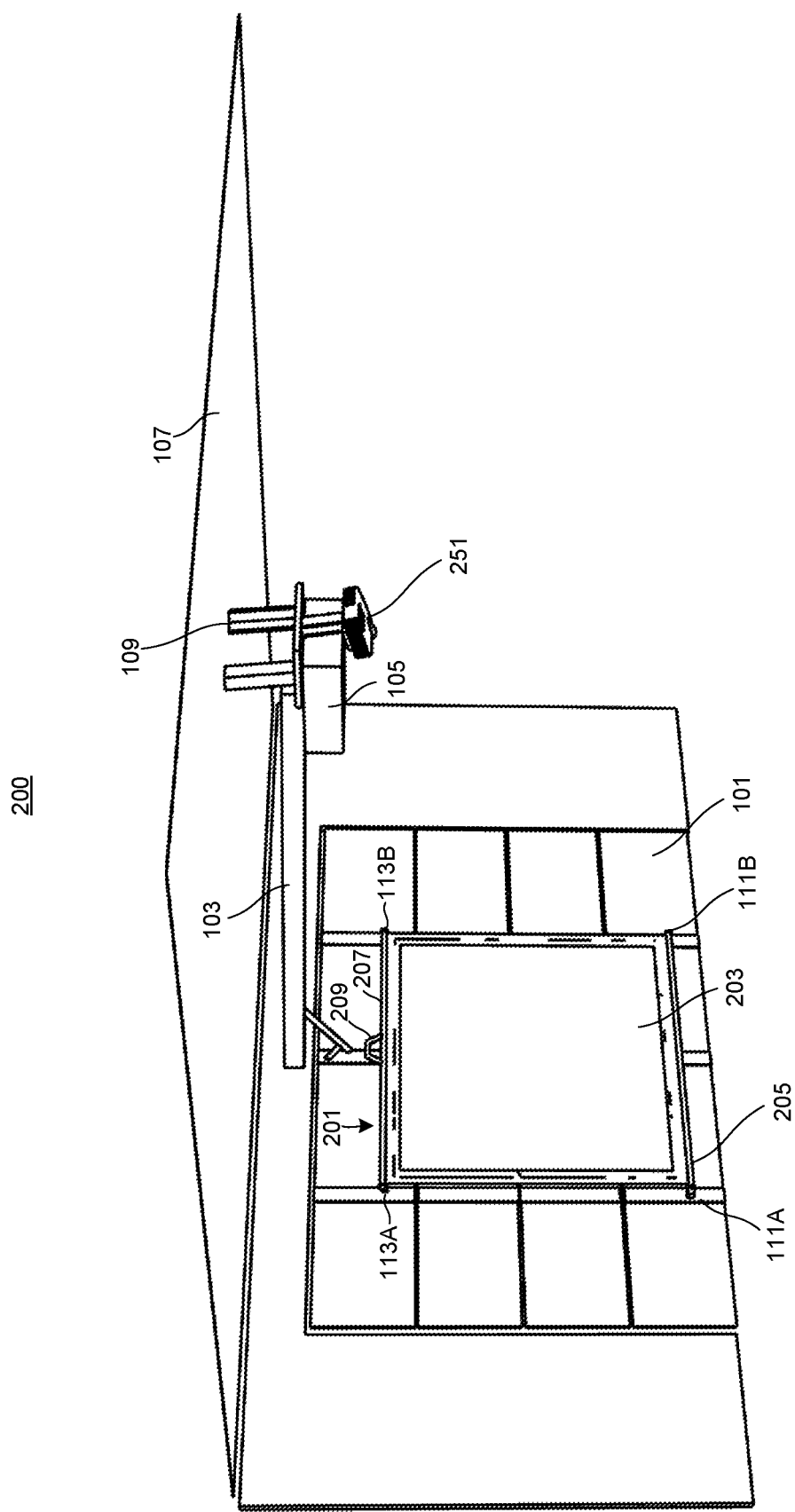
FIG. 3 illustrates a dynamic and multi-sided viewing projection screen system mounted to the garage door in the closed position (or vertical, downward position).

FIG. 3 illustrates a dynamic and multi-sided viewing projection screen system 200 mounted to the garage door 101 in the closed position (or vertical, downward position), the multi-sided viewing projection screen system 200 having a projection screen assembly 201, mounting and fastening hardware, and a video projector 251, which is configured to cast an image or video onto a flat projection screen surface of the projection screen assembly 201, according to an embodiment. The projection screen assembly 201 may include a video projector screen 203 coupled to a bottom-support rod or an automatic roll-up shaft assembly 205 at a first end of the projector screen 203 and a top rod or shaft 207 coupled to a second end of the projector screen 203. The bottom-support rod or automatic roll-up shaft assembly 205 may be mounted near a bottom interior portion (111A, 111B) of the garage door 101, via bottom-mounting brackets (not shown), while the top rod or shaft 207 may be detachably coupled near a top interior portion (113A, 113B) of the garage door 101, via top-mounting brackets (not shown). In practice, the projection screen assembly 201 may include different types of projector screens such as automatic roll-up projector screens or manual roll-up screens. In operation, the bottom-support rod or automatic roll-up shaft assembly 205 of the projection screen assembly 201 remains fixed to the garage door 101, while the top rod or shaft 207 of the projection screen assembly 201 may be easily attached (as shown in FIG. 3) or detached from the top interior portion (113A, 113B) of the garage door 101.

Figure 4:
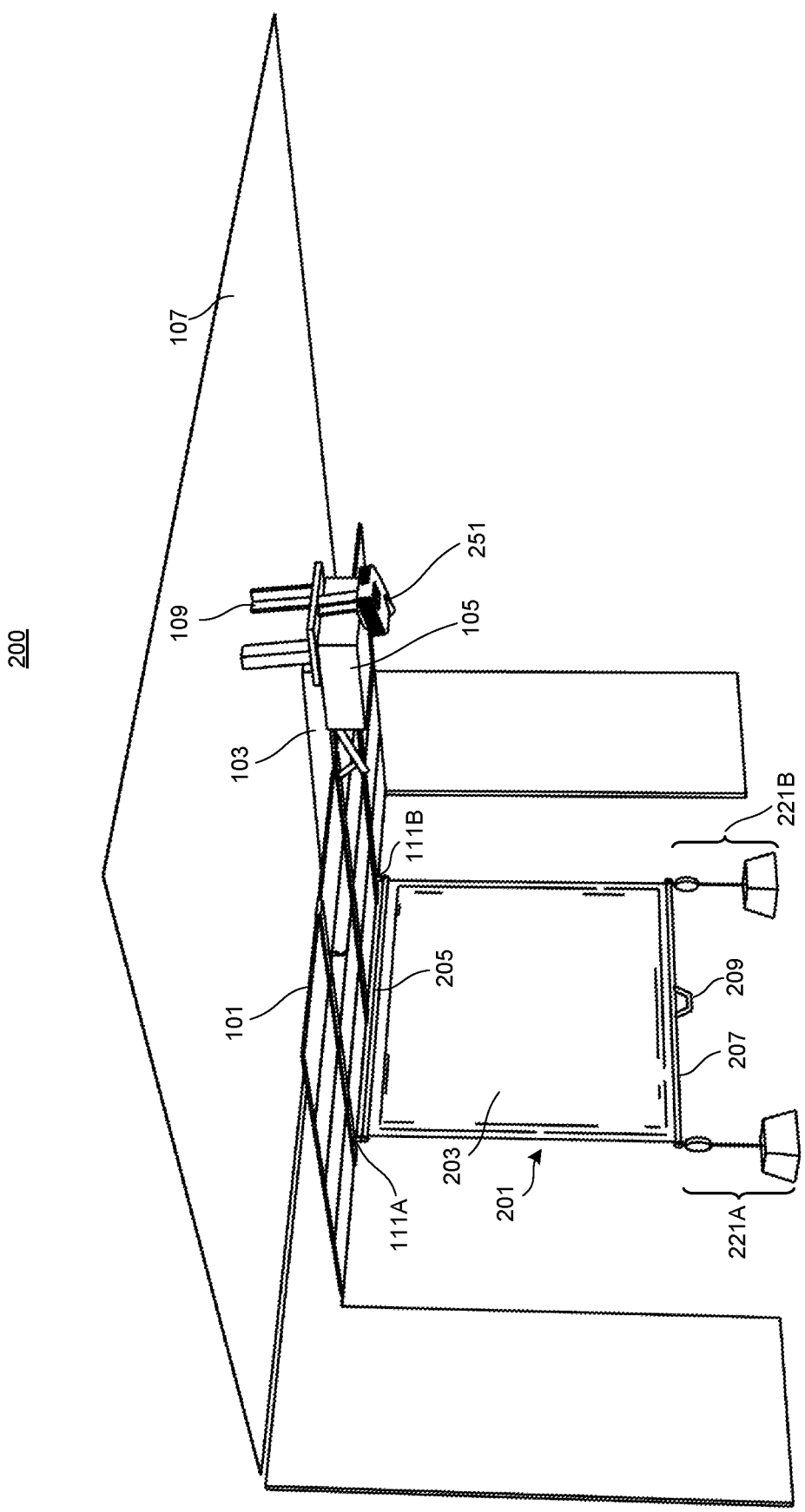
FIG. 4 illustrates the dynamic and multi-sided viewing projection screen system mounted to the garage door in the open position (or horizontal, upward position), according to an embodiment.

FIG. 4 illustrates the dynamic and multi-sided viewing projection screen system 200 mounted to the garage door 101 with the garage door 101 in the open position (or horizontal, upward position), according to an embodiment. In this configuration, the top rod or shaft 207 of the projection screen assembly 201 is detached from the top interior portion (113A, 113B) of the garage door 101, allowing the projector screen 203 to drop and hang below the garage door 101 while it is in the open position as shown. Optionally, a pair of weighted stabilizers (221A, 221B) may be applied and temporarily attached to each end of the top rod or shaft 207 to keep the projector screen 203 taut, preventing it from swinging or moving from slight breezes or wind while the garage door 101 is open.

Figure 5:
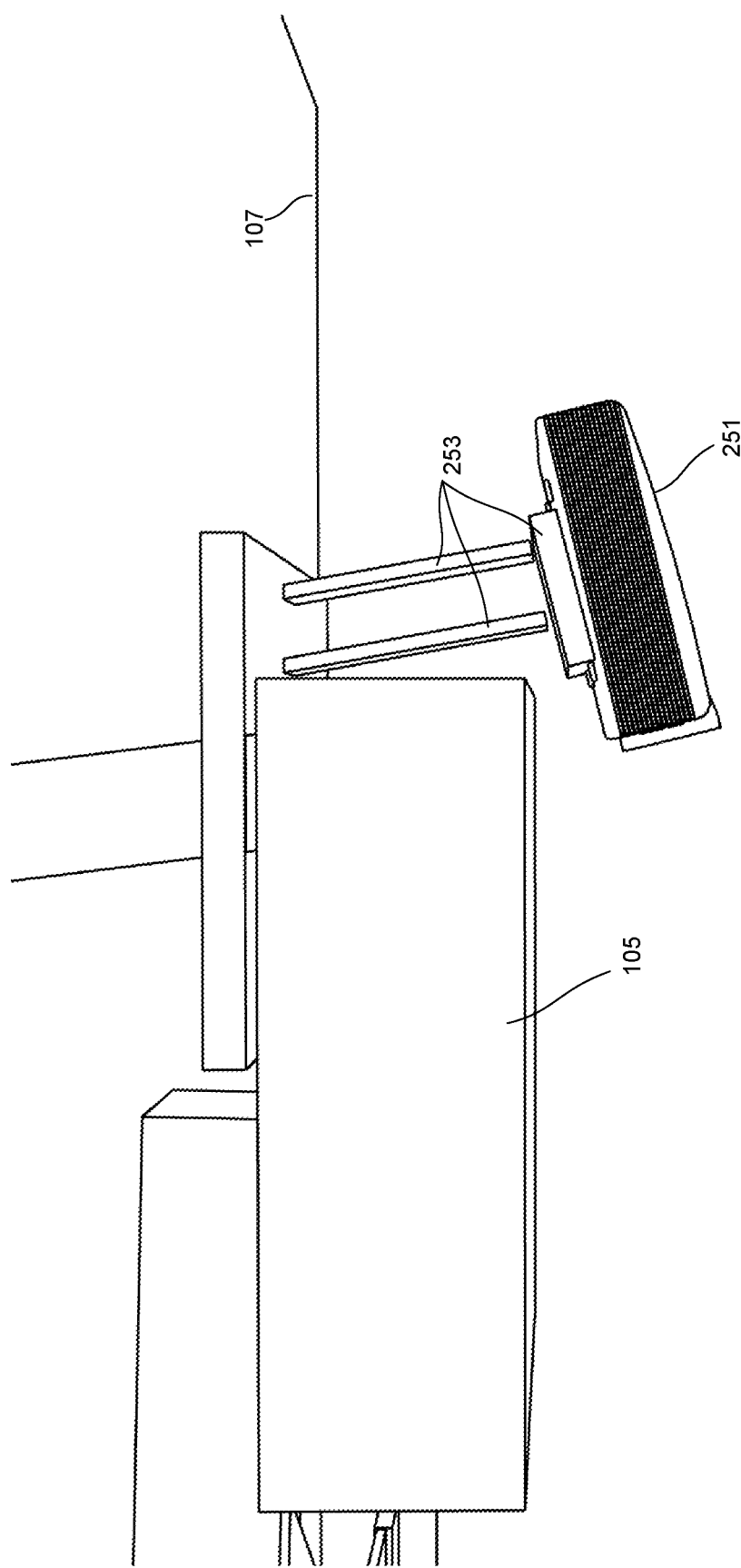
FIG. 5 illustrates the video projector of the dynamic and multi-sided viewing projection screen system, according to an embodiment.

FIG. 5 illustrates the video projector 251 of the dynamic and multi-sided viewing projection screen system 200, according to an embodiment. The video projector 251 may include optical components, audio/video components, a microprocessor, digital circuitry, software, and memory components that generate and project an image or video. Examples of video projectors include slide projectors, AV analog projectors, and digital video projectors. In this example, the video projector 251 may be a high definition digital projector with remote control capabilities that control the power, screen orientation, color, contrast, brightness, volume, and throw of the projector. As illustrated in the previous examples, the video projector 251 may be fixed and attached at a position near or behind the motorized controller 105 or directly to the ceiling 107 via mounting brackets and fasteners 253. At this fixed position, the focal distance and focal plane between the video projector 251 and the projector screen 203 may be configured to be the same regardless whether the garage door 101 is in the open or closed position. This is accomplished by properly affixing the bottom-support rod or an automatic roll-up shaft assembly 205 at a bottom offset distance to the garage door 101 as will be discussed later herein below. Examples of mounting and fasteners 253 that may be used to mount and secure the video projector 251 include straps or ties made from metal, wood, plastics or other durable materials fastened by threaded screws, nails, or strong adhesive materials.

Figure 6:
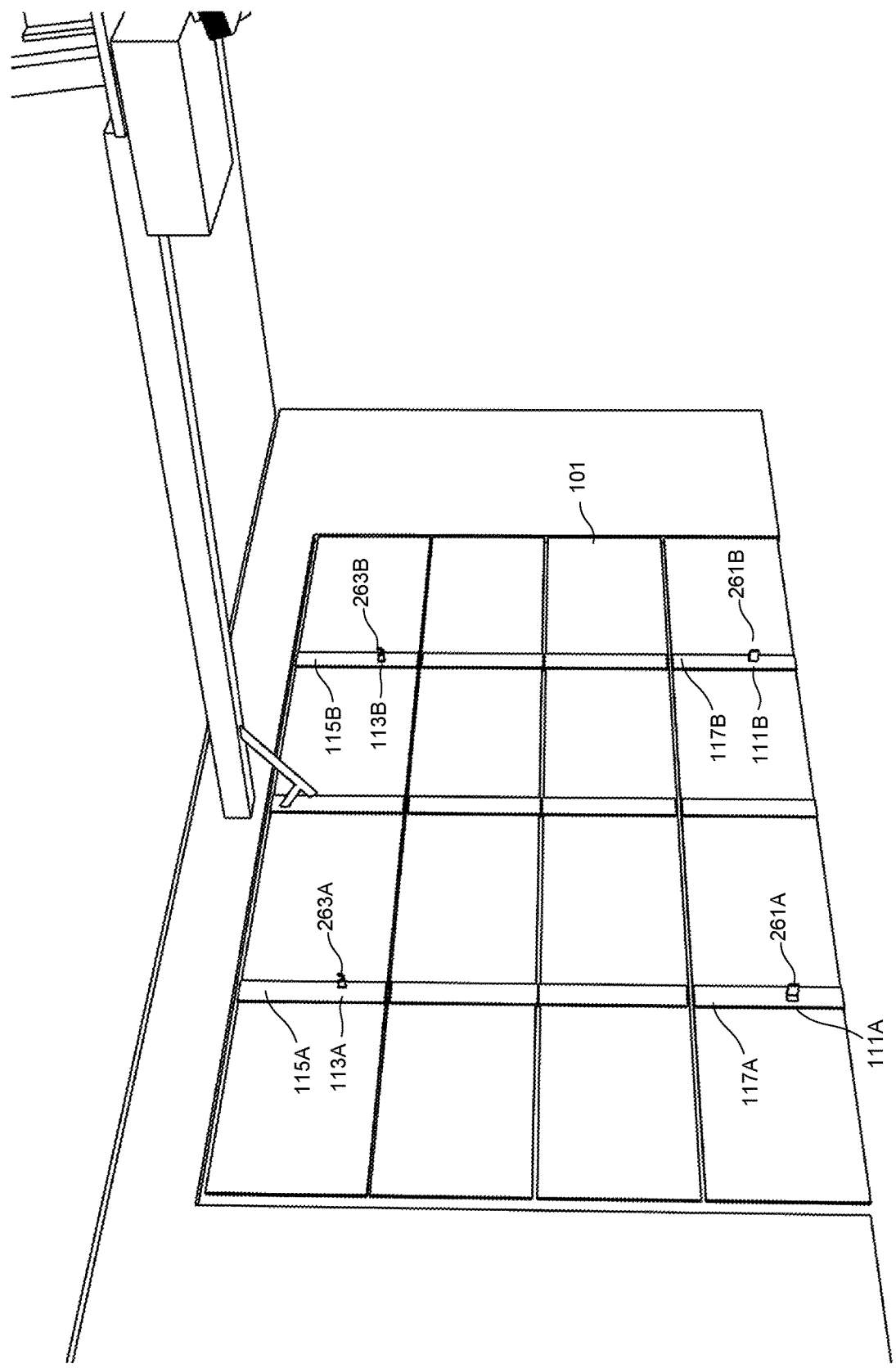
FIG. 6 illustrates bottom-mounting brackets mounted to the bottom interior of the garage door as well as top-mounting brackets mounted to the top interior portion of the garage door, according to an embodiment.

FIG. 6 illustrates bottom-mounting brackets (261A, 261B) mounted to the bottom interior portion (111A, 111B) of the garage door 101 and top-mounting brackets (263A, 263B) mounted to the top interior portion (113A, 113B) of the garage door 101, providing support and securing the dynamic and multi-sided viewing projection screen system 200 to the garage door 101, according to an embodiment. Some automatic garage doors may be equipped with metal stiles or flat metal straps (115A, 115B, 117A, 117B) onto which the bottom and top-mounting brackets can be mounted directly.

Figure 7:
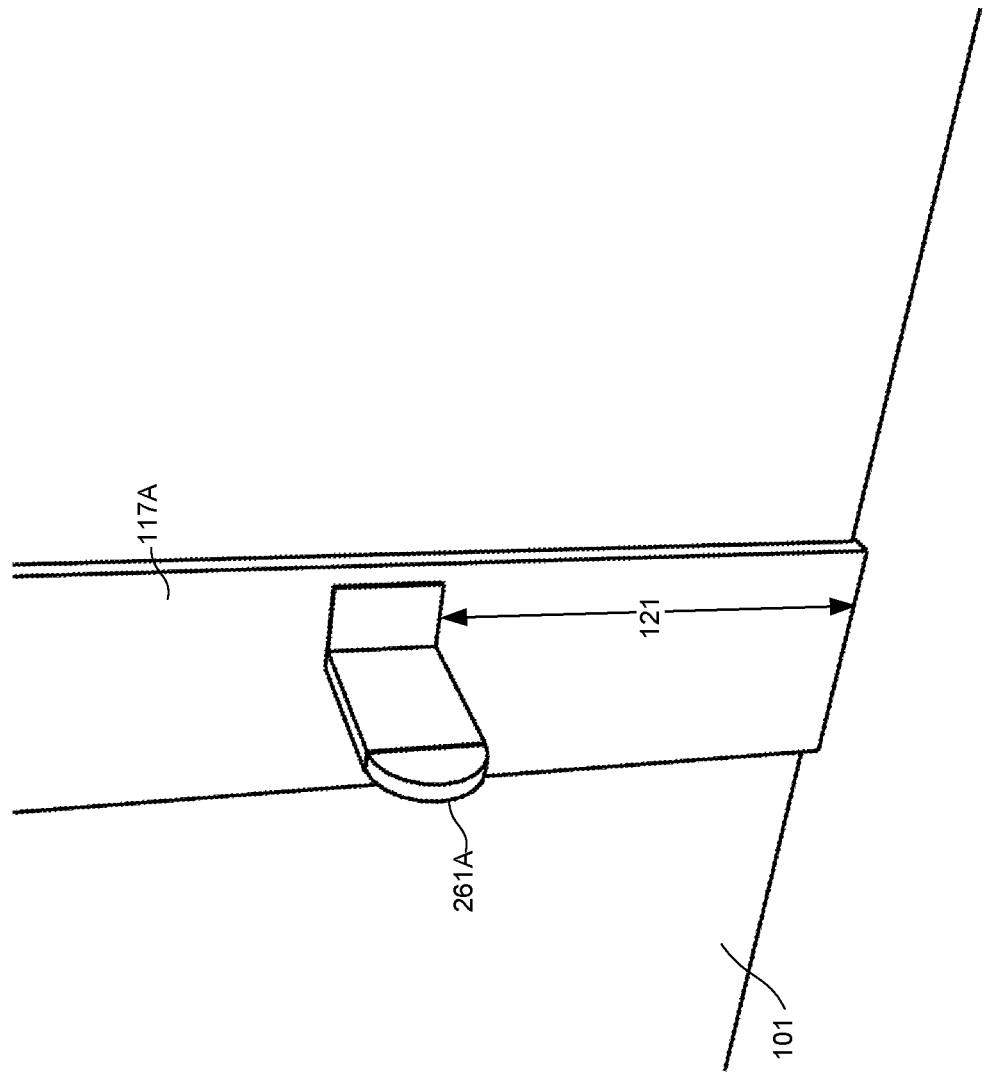
FIG. 7 illustrates a close up view of one of the bottom-mounting brackets mounted to one of the metal stiles of the garage door, according to an embodiment.

FIG. 7 illustrates a close up view of one of the bottom-mounting brackets 261A mounted to one of the metal stiles 117A of the garage door 101, according to an embodiment. Each bottom-mounting bracket may include L-brackets having a long end and short end whereby the short end is fastened and secured to the interior side of the garage door 101, while the long end of the L-bracket is coupled and fastened to one end of the bottom-support rods or automatic roll-up shaft assembly 205 of the projection screen assembly 201. In all operational viewing modes, the bottom-support rod or automatic roll-up shaft assembly 205 remains firmly secured to the bottom portion (111A, 111B) of the garage door 101 while in use, preventing the projection screen assembly 201 to slip or fall off the garage door 101 when the garage door is being raised (opened) or lowered (closed). In addition, in order to keep the focal plane between the projector screen 203 and video projector 251 fixed regardless of whether the garage door is open or closed, the placement of each bottom-mounting bracket is predetermined at a bottom offset distance 121 which is a distance between the bottom of the L-bracket and the bottom of the garage door 101. In other implementations, instead of bottom-mounting-brackets other types of fasteners, fastening techniques, or a combination thereof may be used to secure the projection screen assembly 201 to the garage door 101 such as, for example, bolts, pins, threaded screws, plates, metal welding, and adhesive joints.

Figure 8:
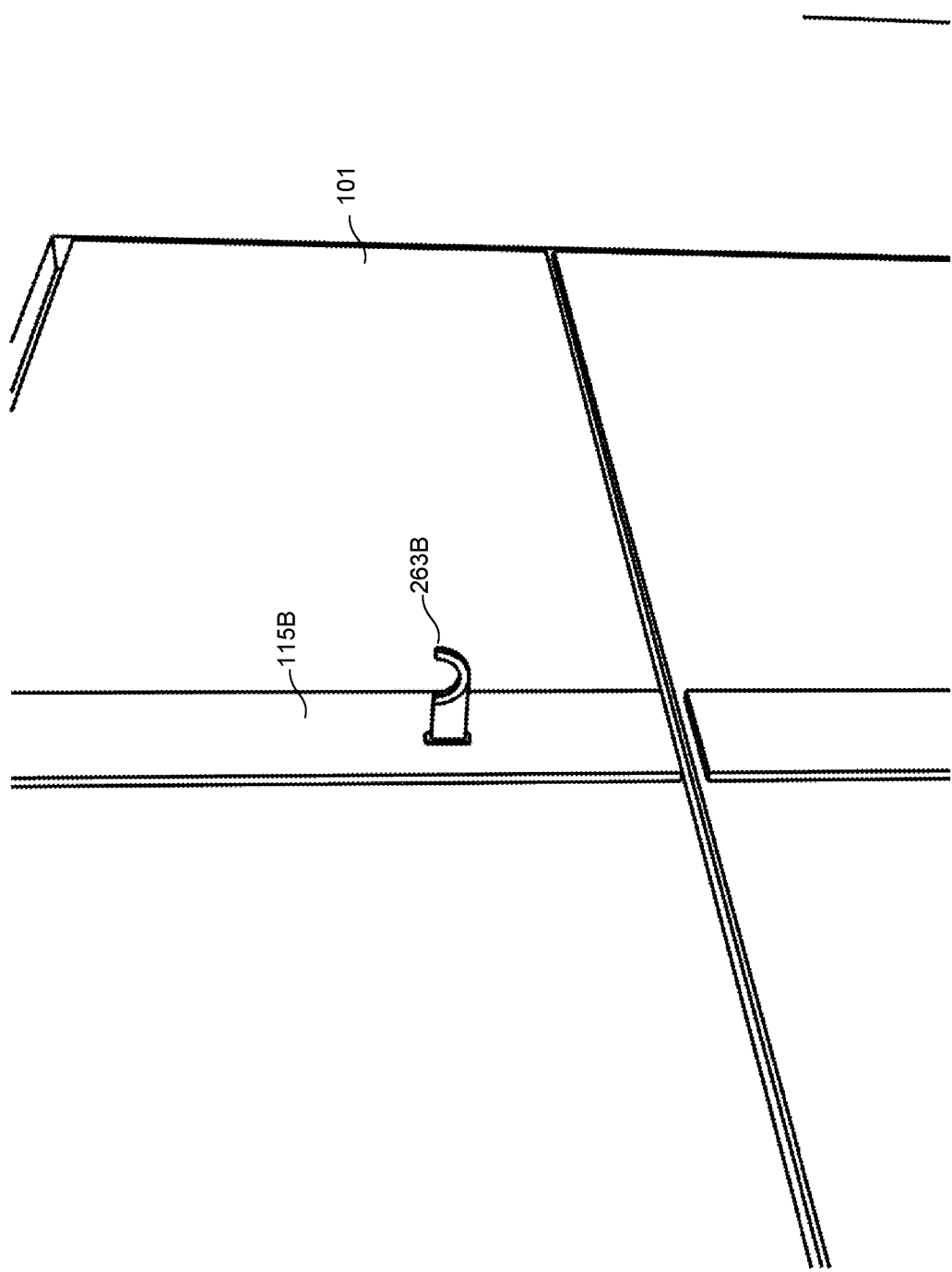
FIG. 8 illustrates a close up view of one of the top-mounting brackets mounted to one of the metal stiles of the garage door, according to an embodiment.
Figure 9C:
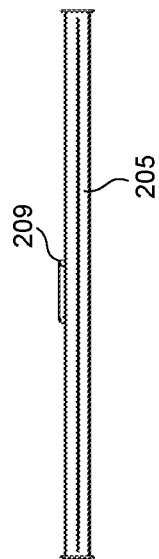
FIGS. 9A-9D illustrate several close up views of the projection screen assembly, including a front view, a side view, a bottom view, and a perspective view, according to an embodiment.
Figure 9D:
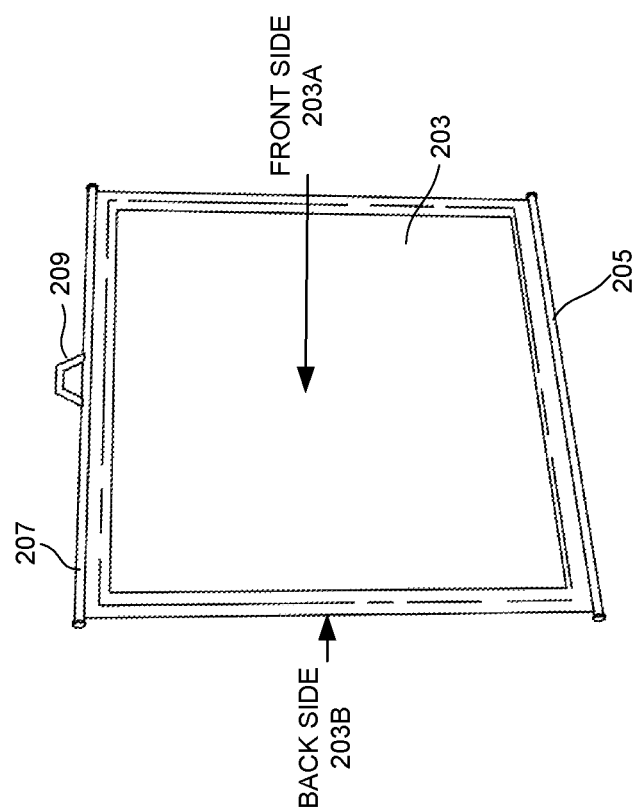
Figure 9B:
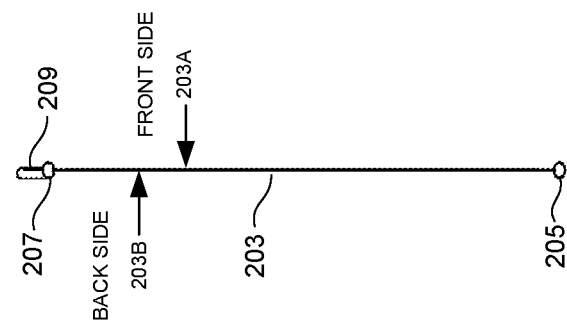
Figure 9A:
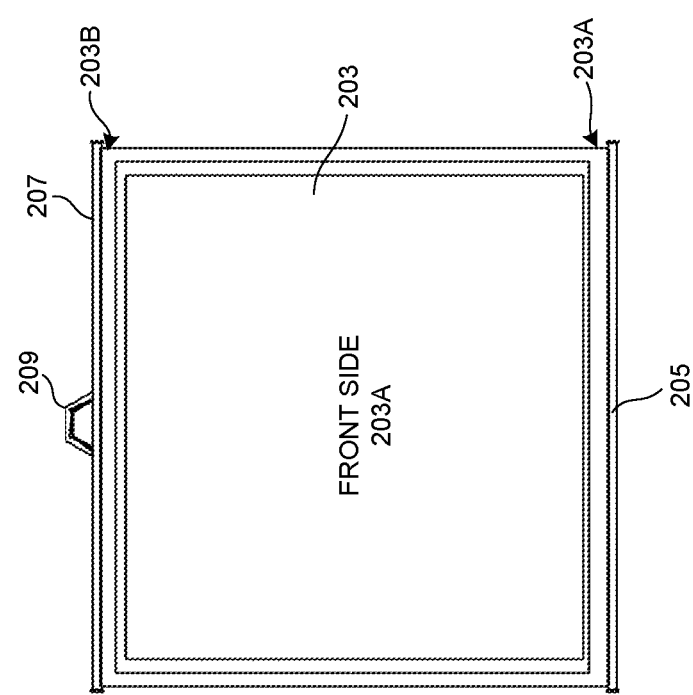

FIG. 8 illustrates a close up view of one of the top-mounting brackets 263B mounted to one of the metal stiles 115B of the garage door 101, according to an embodiment. Each top-mounting bracket may include an open-ended hook (C-shaped brackets) having a flat mounting side and a C-shaped opening, whereby the flat mounting side is fastened and secured to the interior side of the garage door 101 while the C-shaped opening provides support to hold the top rod or shaft 207 keeping the projector screen secured to the garage door 101 while the garage door is in the down position. In practice, the top rod or shaft 207 remains temporarily secured to the top-mounting brackets 263B when the garage door is in the closed or nearly closed position, allowing the projector screen 203 to stay taut. When the top rod or shaft 207 is disconnected from the top-mounting brackets 263B (when the door is in the open position) the projector screen 203 hangs freely beneath the garage door 101. In other implementations, the top-mounting brackets may include other types of open-ended brackets such as j-hooks, clips, clasps, and quick release, or pressure release locking mechanisms.

FIGS. 9A-9D illustrate several close up views of the projection screen assembly 201, including a front-side view, a side view, a bottom view, and a front perspective view, according to an embodiment. As shown in these figures, the projector screen 203 is coupled to the bottom-support rod or an automatic roll-up shaft assembly 205 at a first end 203A of the projector screen 203, while the top rod or shaft 207 is coupled to a second end 203B of the projector screen 203. The projector screen 203 is configured for multi-sided viewing, including two viewing surfaces: a front-side viewing surface 203A and a back-side viewing surface 203B for receiving and displaying the image or video projected from the video projector 251. These multi-sided viewing surfaces (203A, 203B) may be made from thin sheets of material such as natural or synthetic fabrics, plastics, or other composite flexible materials having a white to light gray colored surface with a contrast capable of reflecting and/or partially transmitting (reflecting/receiving) the projected image or video by the video projector 251. In other implementations, the projection screen assembly 201 may include one or more optional handles 209 to grasp and handle the projector screen 203 without having to touch and possibly stain it projector screen 203 when raising, lowering, or attaching it to the mounting brackets. The optional handle 209 may also be used to attach the top rod or shaft 207 to the top-mounting brackets (263A, 263B), and/or the weighted stabilizers (221A, 221B).

Figure 10A:
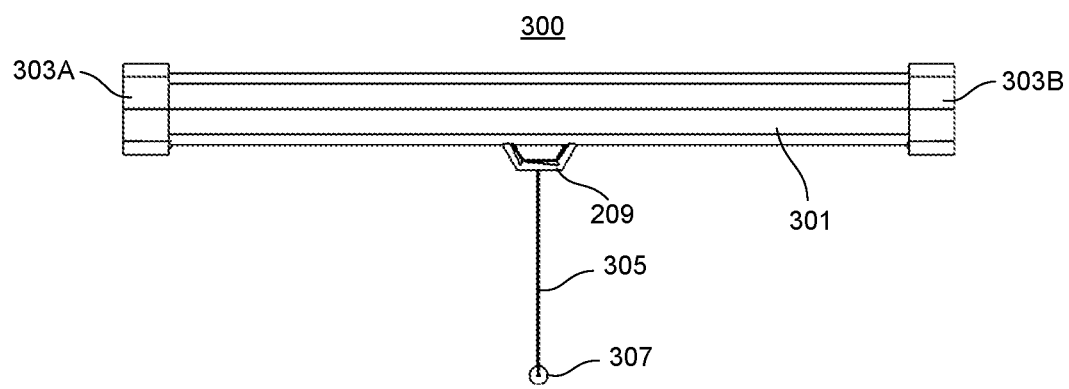
FIGS. 10A-10B illustrate a front view and a perspective view, respectively, of a projector screen case for housing and protecting the projection screen assembly, according to an embodiment.
Figure 10B:
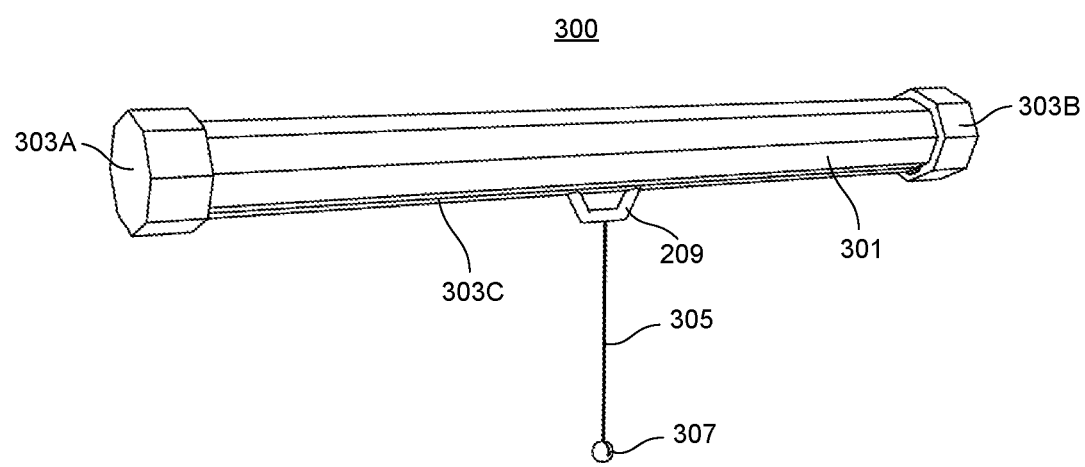

FIGS. 10A-10B illustrate a front view and a perspective view, of a projector screen case 300 for housing and protecting the projection screen assembly 201, according to an embodiment. The projector screen case 300 may include an elongated housing assembly 301, coupled with two end caps (303A, 303B). The elongated housing assembly 301 includes a hollow interior and slot 303 into which the projection screen assembly 201 may be inserted and through which the projector screen 203 may be pulled-in and pulled-out. The two end caps (303A, 303B) may include additional support fasteners and hardware attached to an exterior face edge of the end caps for mounting it directly to the bottom portion (111A, 111B) of the garage door 101. An optional string 305 and ball 307 assembly may be coupled to one or more of the handles 209 of the projection screen assembly 201 for providing additional reach to one or more of the handles 209.

Figure 11A:
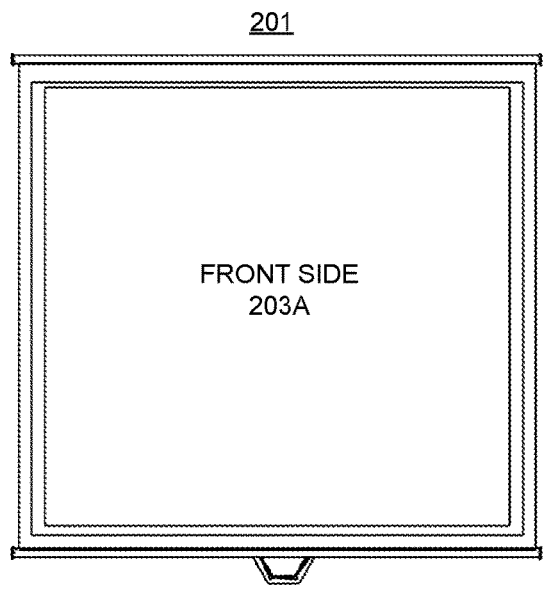
FIGS. 11A-11C illustrate an implementation of a privacy and block-out screen applied to the backside of the projection screen assembly, according to an embodiment.
Figure 11B:
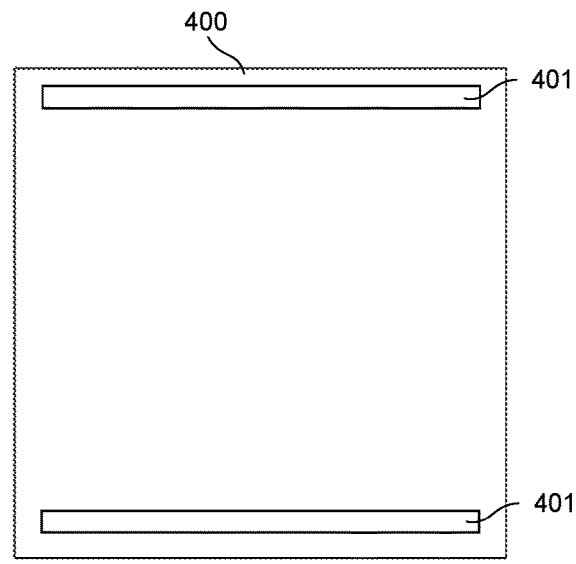
Figure 11C:
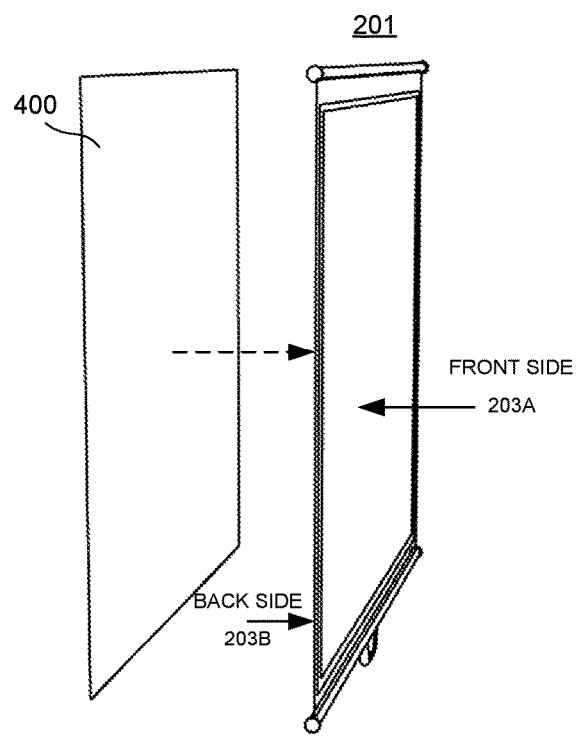

FIGS. 11A-11C illustrate an implementation of a privacy and/or block-out screen 400 applied to the back-side viewing surface 203B of the projection screen assembly 201, according to an embodiment. In operation, the privacy and/or block-out screen 400 serves two functions: 1) to prevent projected images or video of being seen on the backside of the projector screen 203; and 2) to prevent sunlight or ambient light from passing through the backside of the projector screen 203 to the front-side thereof. In both scenarios, the privacy and/or block-out screen 400 is ideally applied and secured to the projector screen 203 or screen case 300 via a fastener 401 when the garage is in the open position (or horizontal, upward position). The privacy and/or block-out screen 400 may include durable sheets of opaque natural or synthetic fabrics. In other implementations, a solid, opaque thin board may be adequately applied as the privacy and/or block-out screen 400. Fasteners, such as hook and loop fasteners, buttons, clips, threads, and/or adhesives, are just a few examples that can secure and mount the privacy and/or block-out screen 400 to the backside of the projector screen 203.

Figure 12:
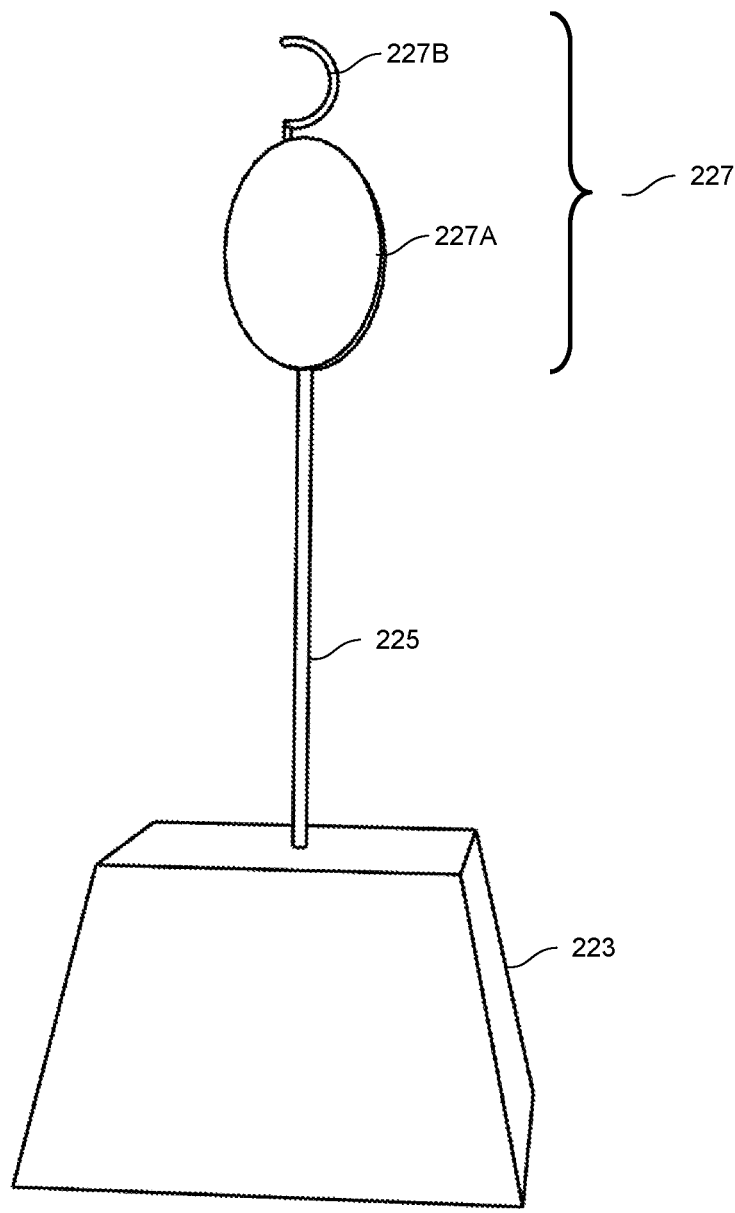
FIG. 12 illustrates a close up view of one of the weighted stabilizers, according to an embodiment.

FIG. 12 illustrates a close up view of one of the weighted stabilizers (221A, 221B), according to an embodiment. The weighted stabilizers (221A, 221B) may include a weighted block 223 coupled to an attached or detachable hook assembly 227 via a support chord, chain or strap 225. The detachable hook assembly 227 may include a retractable component 227A that is configured to adjust the length of the support chain or strap 225, providing sufficient tension to keep the projector screen 203 taut. Other methods of stabilizing the projector screen 203 and keeping it taut may include adjustable ropes or straps tied to a fixed weighted object.

Figure 13:
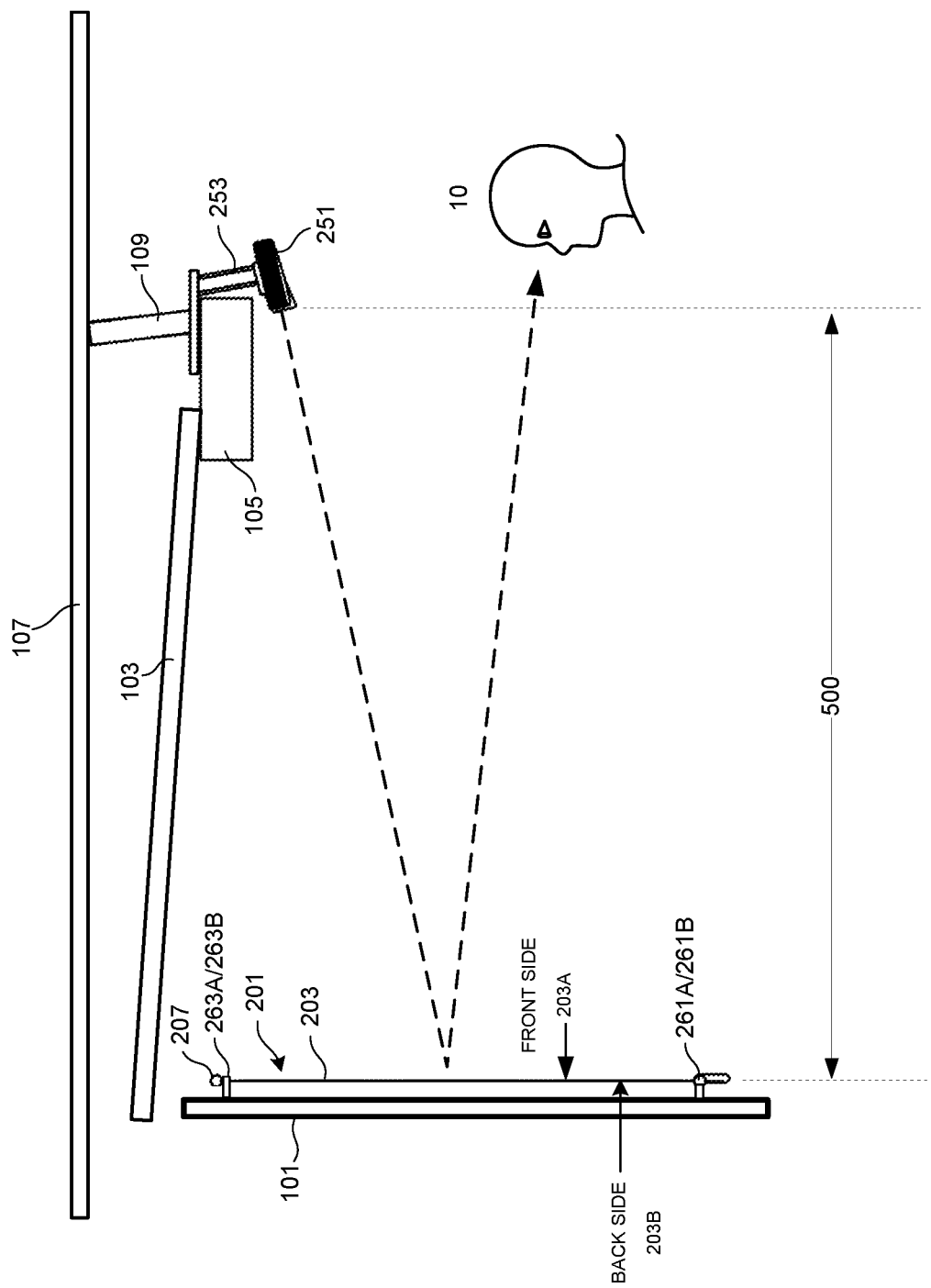
FIG. 13 illustrates a first viewing mode of operation of the dynamic and multi-sided viewing projection screen system by a user, according to an embodiment.

FIG. 13 illustrates a first viewing mode of operation of the dynamic and multi-sided viewing projection screen system 200 by a user 10, according to an embodiment. In the first viewing mode of operation, the garage door 101 is in the closed position (or vertical, downward position). With the bottom-support rod 205 of the projector screen assembly 201 attached to the bottom-mounting brackets (261A, 261B) of the garage door 101, the user 10 pulls the top rod or shaft 207 of the projection screen assembly 201 upward so that it may firmly rest in or attach to the top-mounting brackets (263A, 263B) that are mounted to the top interior portion of the garage door 101, keeping the projection screen fully extended, taut, and ready for viewing from the inside of the garage. The video projector 251 may be situated at a pre-determined fixed focal distance 500 from the projector screen 203 and near the motorized controller 105, providing the user 10 an optimal image or video as viewed on the front-side viewing surface 203A of the projector screen 203 from the inside of the garage.

Figure 14:
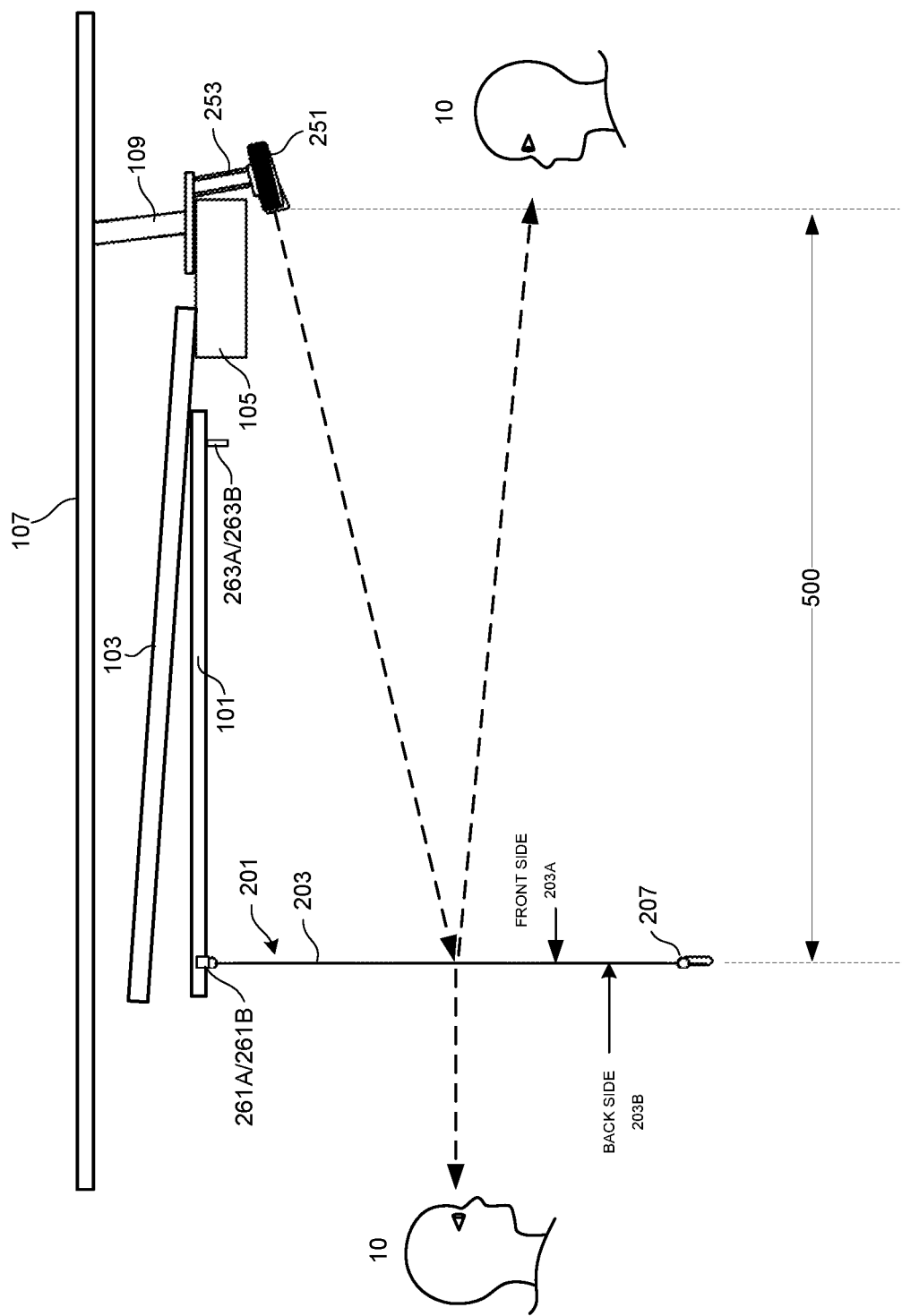
FIG. 14 illustrates a second viewing mode of operation of the dynamic and multi-sided viewing projection screen system by the user, according to an embodiment.

FIG. 14 illustrates a second viewing mode of operation of the dynamic and multi-sided viewing projection screen system 200 by the user 10, according to an embodiment. In the second viewing mode of operation, the garage door 101 is in the open position (or horizontal, upward position) as in a previous embodiment. With the bottom-support rod 205 of the projector screen assembly 201 attached to the bottom-mounting brackets (261A, 261B) of the garage door 101, the user 10 may pull down the top rod or shaft 207 of the projection screen assembly 201 so that it hangs freely from the garage door 101. The optional weighted stabilizers (221A, 221B) may be attached to the top rod or shaft 207 to keep the projection screen taut, outstretched, and ready for viewing. With the video projector 251 situated at the pre-determined fixed focal distance 500 from the projector screen 203, the optimal image or video is maintained at the same position as in the first viewing mode of operation, allowing the user 10 to keep the projector 251 at the same fixed focal position without making further adjustments to focus or image size while the garage door 101 changes from the closed position (vertical, downward position) to the open position (horizontal, upward position). In second viewing mode of operation, the user 10 may view the optimal image or video on either the front-side viewing surface 203A from the inside of the garage or the back-side viewing surface 203B from the outside of the garage.

Figure 15:
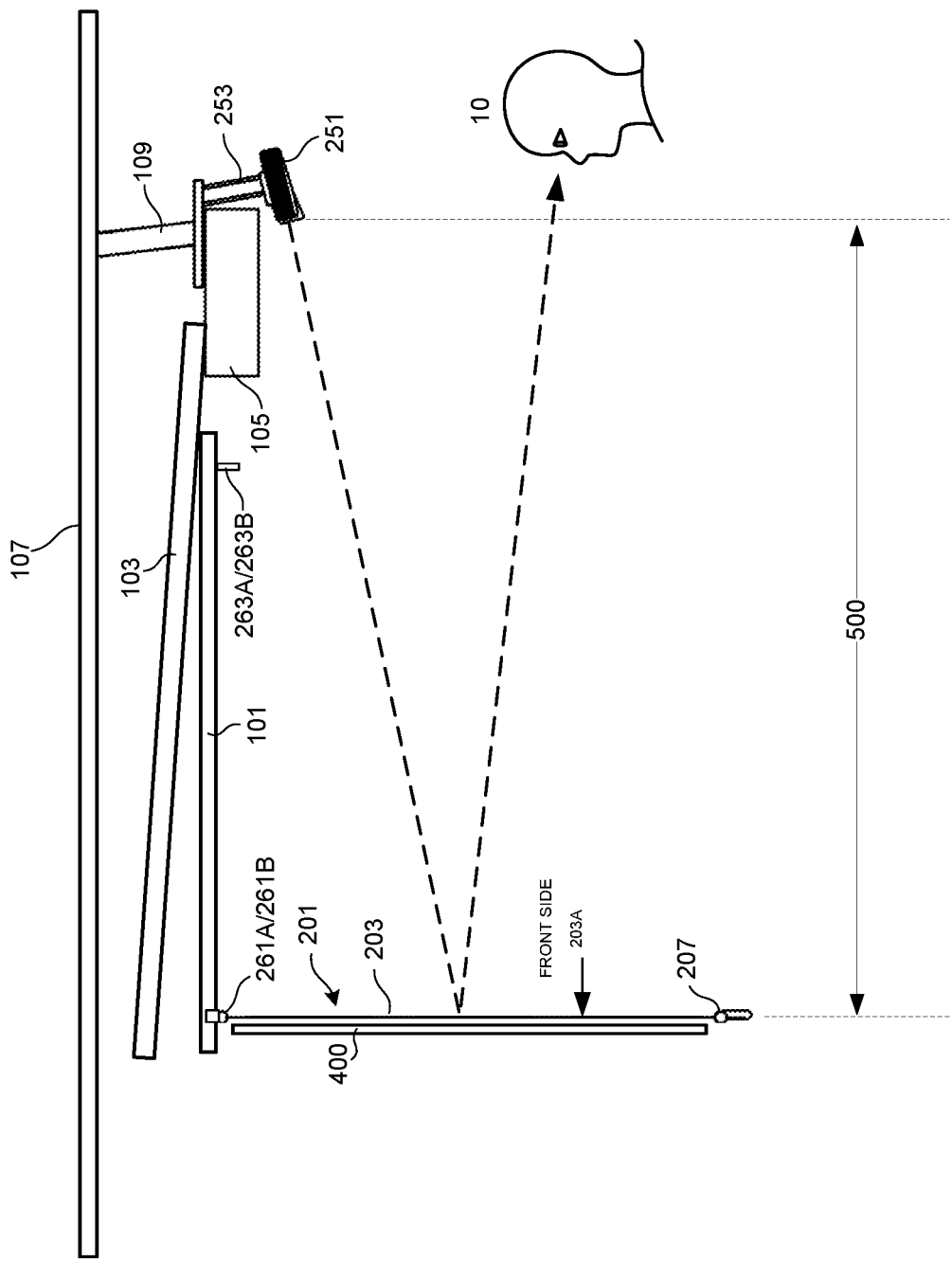
FIG. 15 illustrates a third viewing mode of operation of the dynamic and multi-sided viewing projection screen system by the user, according to an embodiment.

FIG. 15 illustrates a third viewing mode of operation of the dynamic and multi-sided viewing projection screen system 200 by the user 10, according to an embodiment. In the third viewing mode of operation, the garage door 101 is in the open position (or horizontal, upward position). With the bottom-support rod 205 of the projector screen assembly 201 attached and firmly secured to the bottom-mounting brackets (261A, 261B) of the garage door 101, the user 10 may pull down the top rod or shaft 207 of the projection screen assembly 201 so that it hangs freely from the garage door 101. The optional weighted stabilizers (221A, 221B) may be attached to the top rod or shaft 207 to keep the projection screen taut, outstretched, and ready for viewing. With the video projector 251 situated at the pre-determined fixed focal distance 500 from the projector screen 203, the optimal image or video is maintained at the same position as in the first and second viewing modes of operation, allowing the user 10 to keep the projector 251 at the same fixed focal position without making further adjustments to focus or image size while the garage door 101 changes from the closed position (vertical, downward position) to the open position (horizontal, upward position). The privacy and/or block-out screen 400 may be applied to the back-side of the projector screen 203B to enhance the image quality produced on the front-side of the projector screen 203A by reducing or eliminating ambient or stray light that may be transmitted to the back-side of the projector screen 203B. In addition, the privacy and/or block-out screen also provides visual privacy for the user 10 by blocking out the image from being seen from the outside of the garage. In both the first and third viewing modes of operation, the user 10 is able to view the image or video on the front-side viewing surface 203A of the projector screen 203 from the inside of the garage as shown in FIGS. 13 and 15.

In the previous embodiments, the bottom-support rod or automatic roll-up shaft assembly 205 is mounted near the bottom-interior portion (111A, 111B) of the garage door 101 via bottom-mounting brackets, while the top rod or shaft 207 is detachably coupled near the top interior portion (113A, 113B) of the garage door 101 via top-mounting brackets. However, the dynamic and multi-sided viewing projection screen assembly 201 is not limited to any particular mounting location on the garage door 101 and may be mounted anywhere between the top 113 or bottom 111 portions of the garage door 101 as shown in FIG. 16. In one embodiment, the bottom-support rod or automatic roll-up shaft assembly 205 may be mounted near the top interior portion 113 of the garage door 101 via the bottom-mounting brackets, while the top rod or shaft 207 may be detachably coupled near the bottom interior portion 111 of the garage door 101 via the top-mounting brackets. In another embodiment, the bottom-support rod or automatic roll-up shaft assembly 205 may be mounted near a first middle interior portion 112A of the garage door 101 via the bottom-mounting brackets, while the top rod or shaft 207 may be detachably coupled near a second middle interior portion 112B of the garage door 101 via the top-mounting brackets. However, in order to maintain the pre-determined fixed focal distance 500 in all three viewing modes of operation, the bottom-support rod or automatic roll-up shaft assembly 205 must be mounted at or near the bottom interior portion (111A, 111B) of the garage door 101. All other mounting locations of the bottom-support rod or automatic roll-up shaft assembly 205 will require a change to the actual settings of the video projector, due to the throw (distance between the video projector 251 and the projector screen 203) changing from the first viewing mode of operation to the second and third viewing modes of operation.

Several advantages of the dynamic and multi-sided viewing projection screen system 200 may include 1) providing ease of use and quick set-up, since vehicles can still be parked inside of the garage when the bottom-support rod or automatic roll-up shaft assembly 205 is mounted to the garage door 101 and even when the video projector 251 is fixed at a position near or behind the motorized controller 105 or directly to the ceiling 107; 2) allowing the garage to double as an entertainment room; 3) allowing multiple view modes for open, closed, and nearly closed garage door settings; and 4) allowing the projection screen to be used in both indoor and outdoor viewing situations.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims, which include all other such embodiments and modifications when viewed in conjunction with the above specifications and accompanying drawings.

What is claimed is:

1. A dynamic and multi-sided viewing projection screen assembly for a garage door, the dynamic and multi-sided viewing projection screen assembly comprising:
    a video projector screen having a first end, a second end opposite to the first end, a front-side viewing surface and a back-side viewing surface opposite to the front-side viewing surface, wherein the front-side viewing surface and the back-side viewing surface are configured to receive and display a projected image or video from a video projector;
    a bottom-support member coupled to the first end of the video projector screen, wherein the bottom-support member is coupled to one or more bottom-fasteners applied to a first interior portion of the garage door; and
    a top-support member coupled to the second end of the video projector screen, wherein the top-support member is detachably coupled to one or more top-fasteners applied to a second interior portion of the garage door;

wherein the dynamic and multi-sided viewing projection screen assembly is configured to have a plurality of viewing modes of operations, including a first viewing mode of operation and a second viewing mode of operation, wherein the top-support member is pulled up and attached to the one or more top-fasteners at the second end of the video projector screen, exposing the front-side viewing surface in the first viewing mode of operation, when the garage door is closed or nearly closed in a vertical, downward position, and wherein the top-support member is detached and pulled down from the one or more top-fasteners allowing the second end of the video projector screen to hang downward while exposing the front-side viewing surface and the back-side viewing surface in the second viewing mode of operation, when the garage door is open in a horizontal, upward position.

2. The dynamic and multi-sided viewing projection screen assembly of claim 1, wherein the first interior portion is a bottom interior portion of the garage door and the second interior portion is a top interior portion of the garage door.

3. The dynamic and multi-sided viewing projection screen assembly of claim 1, wherein the first interior portion is a top interior portion of the garage door and the second interior portion is a bottom interior portion of the garage door.

4. The dynamic and multi-sided viewing projection screen assembly of claim 1, wherein the bottom-support member includes a shaft or an automatic roll-up shaft assembly.

5. The dynamic and multi-sided viewing projection screen assembly of claim 1, wherein the top-support member includes a shaft, bar, or rod.

6. The dynamic and multi-sided viewing projection screen assembly of claim 1, wherein the dynamic and multi-sided viewing projection screen assembly also includes a third viewing mode of operation, wherein a privacy and block-out screen is applied to the back-side viewing surface of the video projector screen, and the top-support member is detached from the one or more top-fasteners, allowing the second end of the video projector screen to hang downward while exposing the front-side viewing surface in the third viewing mode of operation, when the garage door is open in the horizontal, upward position.

7. The dynamic and multi-sided viewing projection screen assembly of claim 1, wherein the one or more bottom-fasteners include L-brackets, bolts, pins, threaded screws, plates, metal welding, adhesive joints, or a combination thereof.

8. The dynamic and multi-sided viewing projection screen assembly of claim 1, wherein the one or more top-fasteners include C-shaped brackets, j-hooks, clips, clasps, quick release locking mechanisms, pressure release locking mechanisms, or a combination thereof.

9. The dynamic and multi-sided viewing projection screen assembly of claim 1, wherein the video projector screen is composed of thin sheets of material, including natural or synthetic fabrics, plastics, or other composite flexible materials having a white to light-gray colored surface with a contrast capable of reflecting and/or partially transmitting the projected image or video by the video projector.

10. The dynamic and multi-sided viewing projection screen assembly of claim 1, wherein weighted stabilizers are coupled to the top-support member via a detachable hook and a support chain, chord, rope, or cable.

11. A dynamic and multi-sided viewing projection screen system for a garage door, the dynamic and multi-sided viewing projection screen system comprising:

a video projector;
a video projector screen having a first end, a second end opposite to the first end, a front-side viewing surface, and a back-side viewing surface opposite to the front-side viewing surface, wherein the front-side viewing surface and the back-side viewing surface are configured to receive and display a projected image or video from the video projector at a predetermined fixed focal distance;
a bottom-support member coupled to the first end of the video projector screen, wherein the bottom-support member is coupled to one or more bottom-fasteners applied to a first interior portion of the garage door; and
a top-support member coupled to the second end of the video projector screen, wherein the top-support member is detachably coupled to one or more top-fasteners applied to a second interior portion of the garage door;
wherein the dynamic and multi-sided viewing projection screen system is configured to have a plurality of viewing modes of operations, including a first viewing mode of operation and a second viewing mode of operation, wherein the top-support member is pulled up and attached to the one or more top-fasteners at the second end of the video projector screen, exposing the front-side viewing surface in the first viewing mode of operation, when the garage door is closed or nearly closed in a vertical, downward position, and wherein the top-support member is detached and pulled down from the one or more top-fasteners allowing the second end of the video projector screen to hang downward, exposing the front-side viewing surface and the back-side viewing surface in the second viewing mode of operation, when the garage door is open in a horizontal, upward position.

12. The dynamic and multi-sided viewing projection screen system of claim 11, wherein the first interior portion is a bottom interior portion of the garage door and the second interior portion is a top interior portion of the garage door.

13. The dynamic and multi-sided viewing projection screen system of claim 11, wherein the first interior portion is a top interior portion of the garage door and the second interior portion is a bottom interior portion of the garage door.

14. The dynamic and multi-sided viewing projection screen system of claim 11, wherein the bottom-support member includes a shaft or an automatic roll-up shaft assembly.

15. The dynamic and multi-sided viewing projection screen system of claim 11, wherein the top-support member includes a shaft, bar, or rod.

16. The dynamic and multi-sided viewing projection screen system of claim 11, wherein the dynamic and multi-sided viewing projection screen assembly also includes a third viewing mode of operation, wherein a privacy and block-out screen is applied to the back-side viewing surface of the video projector screen and the top-support member is detached from the one or more top-fasteners allowing the second end of the video projector screen to hang downward, exposing the front-side viewing surface in the third viewing mode of operation, when the garage door is open in the horizontal, upward position.

17. The dynamic and multi-sided viewing projection screen system of claim 11, wherein the one or more bottom-fasteners include L-brackets, bolts, pins, threaded screws, plates, metal welding, adhesive joints, or a combination thereof.

18. The dynamic and multi-sided viewing projection screen system of claim 11, wherein the one or more top-fasteners include C-shaped brackets, j-hooks, clips, clasps, quick-release locking mechanisms, pressure-release locking mechanisms, or a combination thereof.

19. The dynamic and multi-sided viewing projection screen system of claim 11, wherein the video projector screen is composed of thin sheets of material including natural or synthetic fabrics, plastics, or other composite flexible materials having a white to light-gray colored surface with a contrast capable of reflecting and/or partially transmitting the projected image or video by the video projector.

20. The dynamic and multi-sided viewing projection screen system of claim 11, wherein weighted stabilizers are coupled to the top-support member via a detachable hook and a support chain, chord, rope, or cable.

21. A dynamic and multi-sided viewing projection screen assembly for a garage door, the dynamic and multi-sided viewing projection screen assembly comprising:
   a video projector screen having a first end, a second end opposite to the first end, a front-side viewing surface and a back-side viewing surface opposite to the front-side viewing surface, wherein the front-side viewing surface and the back-side viewing surface are configured to receive and display a projected image or video from a video projector;
   a bottom-support member coupled to the first end of the video projector screen, wherein the bottom-support member is coupled to one or more bottom-fasteners applied to a first interior portion of the garage door; and
   a top-support member coupled to the second end of the video projector screen, wherein the top-support member is detachably coupled to one or more top-fasteners applied to a second interior portion of the garage door;
   wherein the dynamic and multi-sided viewing projection screen assembly is configured to have a plurality of viewing modes of operations, including a first viewing mode of operation and a second viewing mode of operation, wherein the top-support member is attached to the one or more top-fasteners at the second end of the video projector screen, exposing the front-side viewing surface in the first viewing mode of operation, when the garage door is closed or nearly closed in a vertical, downward position, and wherein the top-support member is detached from the one or more top-fasteners allowing the second end of the video projector screen to hang downward while exposing the front-side viewing surface and the back-side viewing surface in the second viewing mode of operation, when the garage door is open in a horizontal, upward position, and wherein a privacy and block-out screen is applied to the back-side viewing surface of the video projector screen, and the top-support member is detached from the one or more top-fasteners, allowing the second end of the video projector screen to hang downward while exposing the front-side viewing surface in the third viewing mode of operation, when the garage door is open in the horizontal, upward position.

22. The dynamic and multi-sided viewing projection screen assembly of claim 21, wherein the first interior portion is a bottom interior portion of the garage door and the second interior portion is a top interior portion of the garage door.

23. The dynamic and multi-sided viewing projection screen assembly of claim 21, wherein the first interior portion is a top interior portion of the garage door and the second interior portion is a bottom interior portion of the garage door.

24. The dynamic and multi-sided viewing projection screen assembly of claim 21, wherein the bottom-support member includes a shaft or an automatic roll-up shaft assembly.

25. The dynamic and multi-sided viewing projection screen assembly of claim 21, wherein the top-support member includes a shaft, bar, or rod.

26. The dynamic and multi-sided viewing projection screen assembly of claim 21, wherein the one or more bottom-fasteners include L-brackets, bolts, pins, threaded screws, plates, metal welding, adhesive joints, or a combination thereof.

27. The dynamic and multi-sided viewing projection screen assembly of claim 21, wherein the one or more top-fasteners include C-shaped brackets, j-hooks, clips, clasps, quick release locking mechanisms, pressure release locking mechanisms, or a combination thereof.

28. The dynamic and multi-sided viewing projection screen assembly of claim 21, wherein the video projector screen is composed of thin sheets of material, including natural or synthetic fabrics, plastics, or other composite flexible materials having a white to light-gray colored surface with a contrast capable of reflecting and/or partially transmitting the projected image or video by the video projector.

29. The dynamic and multi-sided viewing projection screen assembly of claim 21, wherein weighted stabilizers are coupled to the top-support member via a detachable hook and a support chain, chord, rope, or cable.

30. A dynamic and multi-sided viewing projection screen system for a garage door, the dynamic and multi-sided viewing projection screen system comprising:
   a video projector;
   a video projector screen having a first end, a second end opposite to the first end, a front-side viewing surface, and a back-side viewing surface opposite to the front-side viewing surface, wherein the front-side viewing surface and the back-side viewing surface are configured to receive and display a projected image or video from the video projector at a predetermined fixed focal distance;
   a bottom-support member coupled to the first end of the video projector screen, wherein the bottom-support member is coupled to one or more bottom-fasteners applied to a first interior portion of the garage door; and
   a top-support member coupled to the second end of the video projector screen, wherein the top-support member is detachably coupled to one or more top-fasteners applied to a second interior portion of the garage door;
   wherein the dynamic and multi-sided viewing projection screen system is configured to have a plurality of viewing modes of operations, including a first viewing mode of operation and a second viewing mode of operation, wherein the top-support member is attached to the one or more top-fasteners at the second end of the video projector screen, exposing the front-side viewing surface in the first viewing mode of operation, when the garage door is closed or nearly closed in a vertical, downward position, and wherein the top-support member is detached from the one or more top-fasteners allowing the second end of the video projector screen to hang downward, exposing the front-side viewing surface and the back-side viewing surface in the second viewing mode of operation, when the garage door is open in a horizontal, upward position, and wherein a privacy and block-out screen is applied to the back-side viewing surface of the video projector screen and the top-support member is detached from the one or more top-fasteners allowing the second end of the video projector screen to hang downward, exposing the front-side viewing surface in the third viewing mode of operation, when the garage door is open in the horizontal, upward position.

31. The dynamic and multi-sided viewing projection screen system of claim 30, wherein the first interior portion is a bottom interior portion of the garage door and the second interior portion is a top interior portion of the garage door.

32. The dynamic and multi-sided viewing projection screen system of claim 30, wherein the first interior portion is a top interior portion of the garage door and the second interior portion is a bottom interior portion of the garage door.

33. The dynamic and multi-sided viewing projection screen system of claim 30, wherein the bottom-support member includes a shaft or an automatic roll-up shaft assembly.

34. The dynamic and multi-sided viewing projection screen system of claim 30, wherein the top-support member includes a shaft, bar, or rod.

35. The dynamic and multi-sided viewing projection screen system of claim 30, wherein the one or more bottom-fasteners include L-brackets, bolts, pins, threaded screws, plates, metal welding, adhesive joints, or a combination thereof.

36. The dynamic and multi-sided viewing projection screen system of claim 30, wherein the one or more top-fasteners include C-shaped brackets, j-hooks, clips, clasps, quick-release locking mechanisms, pressure-release locking mechanisms, or a combination thereof.

37. The dynamic and multi-sided viewing projection screen system of claim 30, wherein the video projector screen is composed of thin sheets of material including natural or synthetic fabrics, plastics, or other composite flexible materials having a white to light-gray colored surface with a contrast capable of reflecting and/or partially transmitting the projected image or video by the video projector.

38. The dynamic and multi-sided viewing projection screen system of claim 30, wherein weighted stabilizers are coupled to the top-support member via a detachable hook and a support chain, chord, rope, or cable.

* * * * *